United States Patent [19]

Moll

[11] Patent Number: 5,027,387

[45] Date of Patent: Jun. 25, 1991

[54] REVERSE DIRECTION CALLING SYSTEM

[76] Inventor: Edward W. Moll, 7A Bluebell La., Mt. Laurel, N.J. 08054

[21] Appl. No.: 484,370

[22] Filed: Feb. 26, 1990

[51] Int. Cl.⁵ ...................... H04M 7/10; H04M 15/16
[52] U.S. Cl. .................... 379/112; 379/115; 379/207; 379/219; 379/225
[58] Field of Search ............. 379/114, 115, 121, 128, 379/201, 207, 219, 225, 229, 258, 112

[56] References Cited

U.S. PATENT DOCUMENTS 4,313,036 1/1982 Jabara et al. ................ 379/207

Primary Examiner—Stafford D. Schreyer

[57] ABSTRACT

Apparatus and methods are provided to connect a call between two parties located at different time zones having different calling costs. The calling costs, which relate to tariffed calling rates, are compared to determine which location has the more economical cost of placing the call. The call is then originated from the location having the lower cost.

1 Claim, 6 Drawing Sheets

FIG.1a

NY: 11PM — 60% DISCOUNT — 8AM — 11AM — $$$$$ $$$$$ MAXIMUM RATE $$$$$ $$$$$ — 5PM — 35% DISCOUNT — 11PM

LA: 11PM — 60% DISCOUNT — 7 — 8AM — $$$$$ $$$$$ MAXIMUM RATE $$$$$ $$$$$ — 2PM — 5PM — 35% DISCOUNT — 11PM

FIG.1c

NY: 11PM — 60% DISCOUNT — 8AM — 11AM — $$ $$ MAXIMUM RATE $ $$ — 5PM — 35% DISCOUNT — 11PM

LA: 11PM — 5AM — 8AM — 2PM — 5PM — 8PM

REVERSE DIRECTION CALLING SYSTEM

BACKGROUND OF THE INVENTION

It has been customary and standard practice for the party initiating long distance telephone calls to pay the charges for the call. There are exceptions, however, such as collect telephone calls and IN-WATS on the public telephone network. One reason for the caller to pay for the call is that the caller usually has the greater incentive for placing the call and that the caller controls when the call is made.

The cost of calling may also be borne at the caller's end because originating and routing a call requires more hardware and software equipment than is required at the terminating or receiving end. Another reason that the caller or originator pays is the desirability to maintain a standard procedure and a consistent policy.

In the telecommunications field, regardless of who pays for the communication, the charges for the call are generally based on which end originates the call, i.e. "A calling B collect" is charged to B on the basis of A's tariffs and A's time of day. The cost of a telephone call varies depending on the call originator's time zone and time-of-day.

The reason or incentive to have calls placed, processed, or originated in the reverse direction, i.e. from a called party's end rather than from the calling party's end, is to obtain a lower rate. Discount rates are generally available when telephone plant is most idle as during daytime off business hours and at night. Telephone companies reduce their rates during these periods in order to increase customer's incentive to place calls and to increase utilization of their investment by increasing the number of calls during these hours. This utilizes equipment that would otherwise be idle.

OBJECTS OF THE INVENTION

It is the object of this invention to provide an improved communications system to utilize calling party identification to activate prearranged reverse call procedures in process.

BRIEF SUMMARY OF THE INVENTION

In accordance with the present invention, apparatus and methods are provided to retrieve information from a data base to connect a call through a telephone communications network from a calling location to a called location having different calling rates. Data from the data base provides calling costs at the calling and called locations which are compared to determine the location from which a call may be made more economically, by choosing the optimum calling rate. The call is then processed in a forward direction or in the reverse direction. When the calling cost direction comparisons indicate sufficient savings in the reverse direction, the call is placed from the called party exchange through the telephone communications network. When the calling cost direction comparisons do not indicate sufficient savings, the call is placed in the normal or forward direction through the telephone communications network. Various other data may be considered before a call is connected, including data relating to identification, security and other information.

Other objects and advantages of the present invention will be apparent and suggest themselves to those skilled in the art from a reading of the following specification and claims, taken in conjunction with the accompanying drawings.

DESCRIPTION OF THE DRAWINGS

FIGS. 1(a)-1(c) show a chart illustrating calling rates at two different locations during different time periods;

DESCRIPTION OF THE INVENTION

Figure 2:
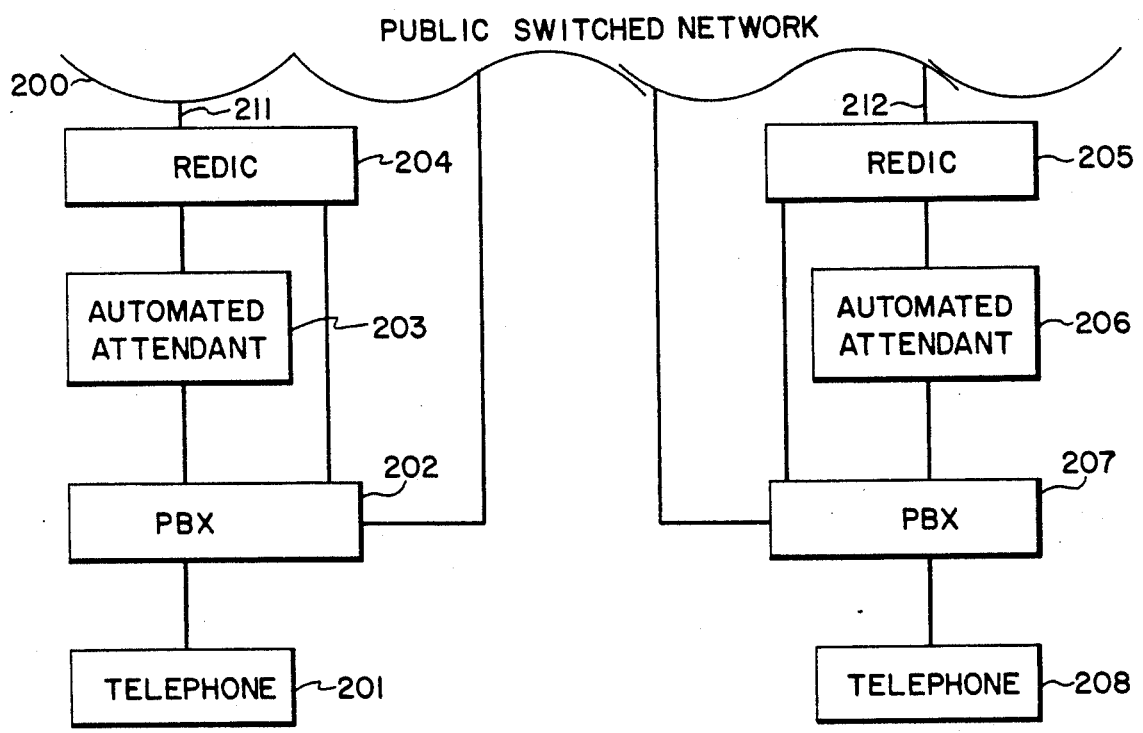
FIG. 2 is a block diagram illustrating the present invention as used between two separate telephone terminals, PBXs, automated attendants and digital processing equipment.

In general, the present invention involves a system having specially equipped switching nodes, hereinafter called nodes, from which one party may call another party. Further, either node has the ability to place a given call. Each node includes a digital computer having a data base and equipment capable of performing the operations involving the present invention.

Calling costs and other considerations are taken into account for placing the call from the calling and called party nodes to determine the location from which the more economical call can be placed. The call is then originated from the more economical location. If it is determined that no substantial savings can be effected by originating a call in the reverse direction, then the call proceeds in a conventional manner through the network.

When a more economical call can be made in the reverse direction, from the called party node, the call is originated from the called party node. Data may be retrieved from the data base relating to security information, calling and called party identification, verification that the nodes have the equipment necessary to carry out the invention, and any other data which it may be desirable to include within the system.

The present invention may be considered as a form of REverse DIrection Calling and may sometimes be referred to as a REDIC system in this specification for purposes of brevity. REDIC equipment is installed at each node in the system of this invention.

Before describing the present invention in detail various factors will be discussed briefly which are involved in determining from which end to originate a call from the point of view of overall economy. These factors include consideration of country rates, discount periods, monetary exchange, and time zone difference. Whatever the reason, the cost of a telephone call may be different depending on which end originates the call (i.e. what country and in which time zone the calling and called parties are located). The present invention is broadly related to originating a call from the more economical end. Calling rates will be discussed before describing embodiments of the invention.

For years, people have made an effort to place telephone calls during discount hours and from the cheaper time zone location. This is done by noting the different tariffed rates for day Vs. night and for the countries involved. For instance, some people make prior arrangements to place phone calls at the time of day and from the country which effects the greater economy.

Following this pattern, someone calling another country may realize that the cost would be less if the party at the other end had placed the call. The party wanting to make the call may, in fact, make the call, identify himself to his friend, and immediately say, "Please call me back and I'll reimburse you for the charges. It's cheaper if you place the call." Such procedures have been done for many years. However, this procedure is generally inconvenient and more costly for calls of short duration.

FIG. 1 is a diagram illustrating the price advantage which can be obtained using the four different time zones of the United States. The full rate for originating a telephone call from any location in the U.S. is a 9 hour period. FIG. 1a illustrates the New York (NY) maximum rate of 8 AM to 5 PM and FIG. 1b illustrates the Los Angeles (LA) maximum rate of 8 AM to 5 PM. Using the 3 hour time difference between NY and LA, the maximum rate calling period can be reduced from the 9 hour period to a 6 hour period, if the user controls from which time zone the call originates.

FIG. 1c illustrates the relationship between the NY and LA calling rate periods. Dollar signs highlight and differentiate the maximum price calling rate from the discount rates.

In this embodiment of the invention, REverse DIrection Calling (REDIC) equipment is employed to originate calls from the city having the lower rate at the time the call is placed, regardless of which party initiates the call. As illustrated in the time zone charts (FIG. 1) when a caller in NY desires to talk to someone in LA and the rate from LA to NY is cheaper, as for example, when it is 10 AM in NY and 7 AM in LA, the REDIC equipment in LA is told by means of a short data message that it should place a call to the party in NY. If the LA party is available and the REDIC equipment is activated, the call will be placed from LA at a 60% discount rate. The REDIC equipment is capable of providing the NY party with call progress information and availability of the LA party.

This theory can be applied with even greater savings beyond the limits of the United States. Examples such as NY to London, NY to Tokyo, NY to Frankfurt, NY to Sydney, etc. will yield more substantial economies. A review of the International Telephone rates will show a predominantly lesser expense (by a large majority) for calls originating in the United States Vs calls originating outside the U.S.

Referring to FIG. 2, there is illustrated one embodiment of the present invention composed of two REDIC equipped nodes utilizing a public switched network 200. Assume that a calling party located at telephone 201 dials the number of a called party located at telephone 208. Each of the telephones 201 and 208 may be ISDN, TWX, TELEX, teletype, video, and other terminals.

A call is sent into a private branch exchange (PBX) 202 node as if it were to be initiated in the normal manner over public network 200 which may be a conventional telephone network. The PBX 202 finds in its data base (not illustrated) that the called number is destined for a REDIC receiving location and routes the call via the automated attendant 203 to the REDIC equipment 204. As previously mentioned, all the nodes in the system include REDIC equipment necessary to carry out the present invention.

When REDIC 204 determines that the call would be cheaper if it were originated at the called party node via the public switched network 200 toward the calling party, REDIC 204 sends a message (e.g. packetized X.25) via line 211, the public switched network 200 and line 212 to the called party's REDIC equipment 205. After REDIC 205 checks for errors and verifies that the message is from an approved REDIC node, REDIC 205 commands the automated attendant device 206 to cause the PBX 207 to originate a call on the public switched network 200 to the calling party's PBX 202. The PBX 202 connects its calls from the public switched network 200 to its automated attendant 203 and to REDIC 204 for REDIC screening and control. Thus it may be seen that when sufficient savings are indicated, the call is originated from the called party node in the reverse direction rather than from the calling party node.

When a call from the public network 200 to PBX 202 is not REDIC related, the REDIC equipment 204 will not detect a REDIC message from the called party node. After a short period of time the automated attendant device 203 handles the incoming call in a conventional manner. When REDIC 204 finds the call from the public network 200 to be a response to a request for call origination, it matches the related calling and called lines and instructs the automated attendant device 203 to transfer the incoming call and the calling party to a common connection to enable the parties to start talking. The involvement of savings analysis, request messages, error checking, security, and call progress announcements are described along with the detailed descriptions of FIGS. 3 and 4.

Figure 3:
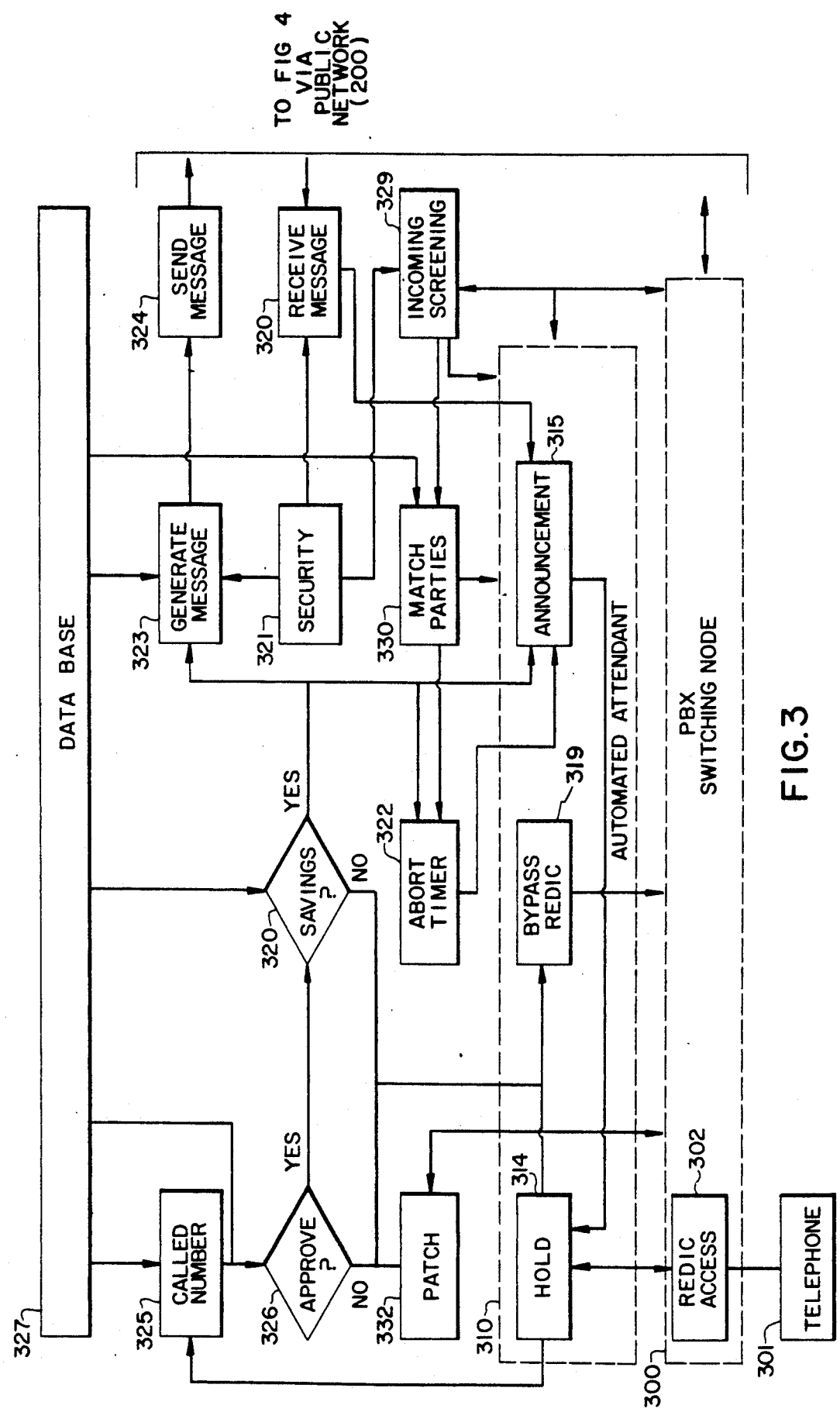
FIG. 3 is a block diagram illustrating a system or node located at a calling party's node, in accordance with the present invention.
Figure 4:
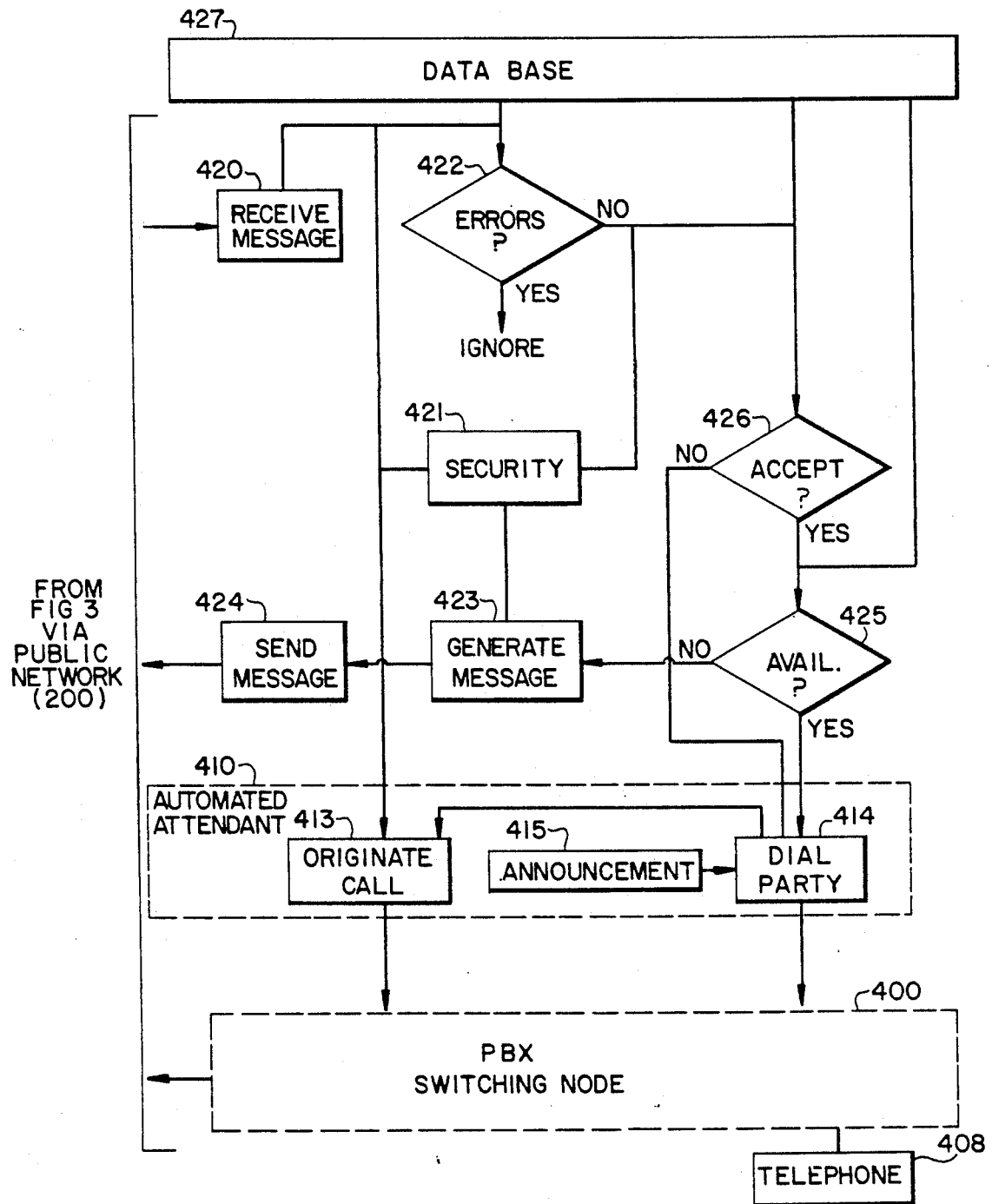
FIG. 4 is a block diagram illustrating a system or node located at a called party's node in accordance with the present invention.

Referring to FIGS. 3 and 4, details of a REverse DIrection Calling System (REDIC) for causing calls to be originated from the more economical direction for the telephone user to obtain reduced calling costs. FIG. 3 illustrates the calling party node and FIG. 4 illustrates the called party node. The calling party node effects the receipt of a called number, evaluates the savings potential, and pursues the task of accomplishing the most economical means of obtaining a public switched network connection to the desired telephone, which will be described in connection with FIG. 3.

Referring particularly to FIG. 3, a calling party at telephone terminal 301 on a PBX 300 dials the code for REDIC access 302. The PBX 300 makes a connection to an automated attendant device 310, which includes a hold means 314 which provides an announcement requesting the telephone number of the party desired. The automated attendant 310 has the ability to receive telephone numbers before and during the announcement to take care of the case of an experienced REDIC user who does not want to wait for the announcement to finish. Hold 314 maintains the connection and passes the called number to the called number store means 325.

REDIC approved means 326 verifies that the called number coincides with the approved REDIC node location information in data base 327. As previously mentioned, the present invention is directed towards a group of nodes which include the REDIC equipment including the basic means and equipment illustrated in FIGS. 3 and 4. When both parties have REDIC equipment, a sufficient savings means 328 utilizes the information in the data base 327 to determine if a sufficient savings can be made by originating the call in the reverse direction, i.e. from the called party node. If the called number is of a location not approved by means 326 for REDIC or if sufficient savings means 328 can not be accomplished with a reversed call origination, the call is bypassed through REDIC bypass means 319 and the PBX 300 to the public switched network 200 (FIG. 2) in the normal manner.

If sufficient savings means 328 indicate that savings can be made, an announcement is sent by announcement means 315 to the calling party telephone 301 via hold means 314, the REDIC access means 302, and the PBX 300 to tell the caller that REDIC will handle the call. A request message is generated by means 323 to request that the called party node originate the call. The request message may contain calling party information, security codes and handshaking information. This message is sent by send message means 324 in packet form via the public switched network 200 to the called party node (FIG. 4).

The abort timer 322 is set when a reverse direction call is affirmed by sufficient savings 328. The abort timer 322 expires after a predetermined time lapse if (1) there is an extended delay in the REDIC call processing, or (2), if there is network congestion, or (3), if a failure prevents a REDIC connection, or (4) if a timely response is not received from the called party node. When the abort timer expires, an announcement from means 315 will be transmitted to the calling party stating the condition that exists.

It is noted that data from the data base 327 is selectively applied to control the operations of the called number store means 325, REDIC approved means 326, sufficient savings means 328 and the generate request message means 323. The various forms of data from the data base is controlled by a conventional computer. Blocks having reference numerals other than those previously mentioned will be described in connection with the description of FIG. 4.

Referring to FIG. 4, a called party REDIC equipment receives the request message from the calling party node (FIG. 3) at receive message means 420. The message is error checked at means 422 and unacceptable messages are ignored. Utilizing the data base 427 regarding the called party data, the REDIC equipment determines availability, i.e. no stored restrictions, by means 425 and acceptance by means 426 of agreement with the calling party to have the call originated at the called party's end. If acceptance 426 is positive and available 425 determined that the called party had not stored any restrictions in its REDIC's data base 427, and the called telephone 408 is not busy, the automated attendant 410 is instructed to dial the calling party node by means 414 via the PBX 400. Ringing commences at the called party's telephone 408.

If acceptance by means 426 or availability at means 425 is negative, or if dial party means 414 finds the called party's line to be busy, the called party's REDIC equipment will generate a reject message at means 423 including the reason for the denial. A message is sent by send message means 424 to the calling party's receive message 320 equipment (FIG. 3). When the reject message is received at the calling party node (FIG. 3), an announcement from means 315 will be transmitted to the calling party telephone 301 via hold means 314 and REDIC access means 302 stating the condition that exists.

When dial party 414 determines the desired line is not busy, it causes call originate 413 to place a telephone call Via the PBX 400 and the public switched network 200 (FIG. 2) to the calling party's PBX 300 (FIG. 3) in the conventional direct dial manner. Call originate 413 utilizes the calling party node telephone number obtained from receive message 420 and utilizes encryption parameters obtained from security 421.

While making the connection back to the calling party, if the called party answers before the final connection is made, an announcement 415 informs the called party that a REDIC call is in process, and the location from which the request came.

Referring again to FIG. 3, when the calling party PBX 300 answers an incoming call, it makes a connection to the automated attendant 310 for the call to be processed as a normal incoming call would be serviced by the automated attendant. Incoming screening 329 is attached to the same incoming call connection from the PBX 300 to the automated attendant 310. Incoming screening 329 sends a signal (on the incoming connection to the automated attendant) back to the called party's originate call 413 via PBX 300, the public network 200 and PBX 400. FIG. 4's originate call 413 detects the signal as an indication that REDIC equipment has been reached and handshaking can begin.

Note that signals sent between incoming screening 329 and originate call 413 may be a combination of tones, modulated digital data, recorded voice or others as the state of the art progresses. Security may be accomplished with a short recorded spoken password and voice print identification.

Security codes and call information will be passed in both directions between originate call 413 and incoming screening 329. The two REDIC nodes are capable of sending and receiving signals using data over voice (DOV), low level tones, low level recorded voice, or other means without interfering with automated attendant operation. Upon receiving the first valid transmission from originate call 413, incoming screening 329 notifies automated attendant 310 to withold its customary announcement toward the incoming trunk call.

The automated attendant 310 at the calling party node is programmed to delay its incoming call processing for a predetermined time lapse to permit the detection of a REDIC response by incoming screening 329. If incoming screening 329 does not detect REDIC signals after the predetermined time lapse, the automated attendant 310 sends an announcement to request (in the conventional manner) that the non-REDIC incoming trunk caller dial the additional digits to select an extension or department. The automated attendant's handling of incoming PBX calls is a procedure well known by those skilled in the art.

When incoming screening 329 completes its information exchange, it sends the called party number to match parties means 330. Match parties 330 correlates the calling party's original appearance in called number store 325 and the current incoming screening call 329 from originate call 413. Match parties 330 resets the abort timer 322 and notifies the automated attendant 310 to transfer both the calling and called parties to a "meet-me" conference appearance on the PBX 300. For PBXs that do not offer a meet-me conference feature, the calling and called parties are transferred to an external 2 line patch unit 332 which is connected to two predesignated PBX line appearances. The patch 332 consists of a conference circuit and call control circuitry. Patch 332 has the ability to detect ringing, trip ringing and connect a talking path between the two PBX line appearances. Patch 323 will restore to the normal receive mode when the parties disconnect.

The PBXs 202 and 207, automated attendants 203 and 206, and REDIC equipments 204 and 205 (FIG. 2) will clear the call when either party disconnects. The times of each event involved in REDIC calls are recorded in the data bases 327 and 427 for use with off line processing to verify billing and transfer compensation moneys from the calling to called parties.

This invention applies equally to voice, video, data, and other systems, including their respective terminals and nodes.

Figure 5A:
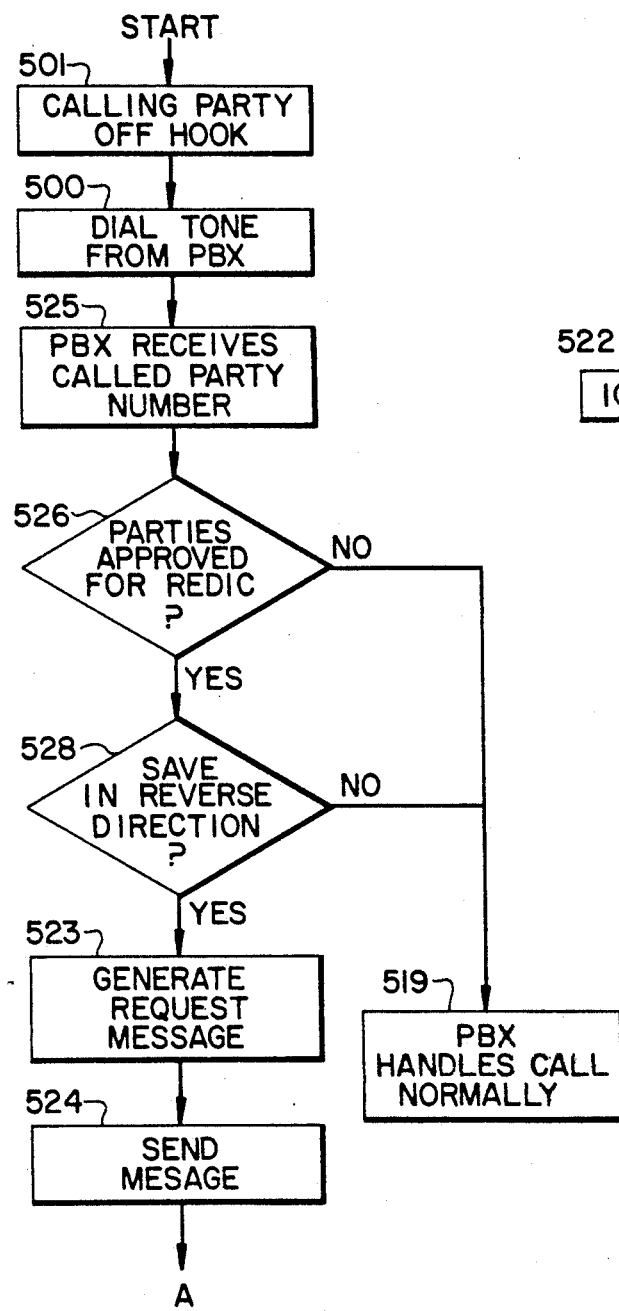
FIGS. 5a and 5b illustrate the main steps involved at a calling party's node or location, in accordance with the present invention.
Figure 5B:
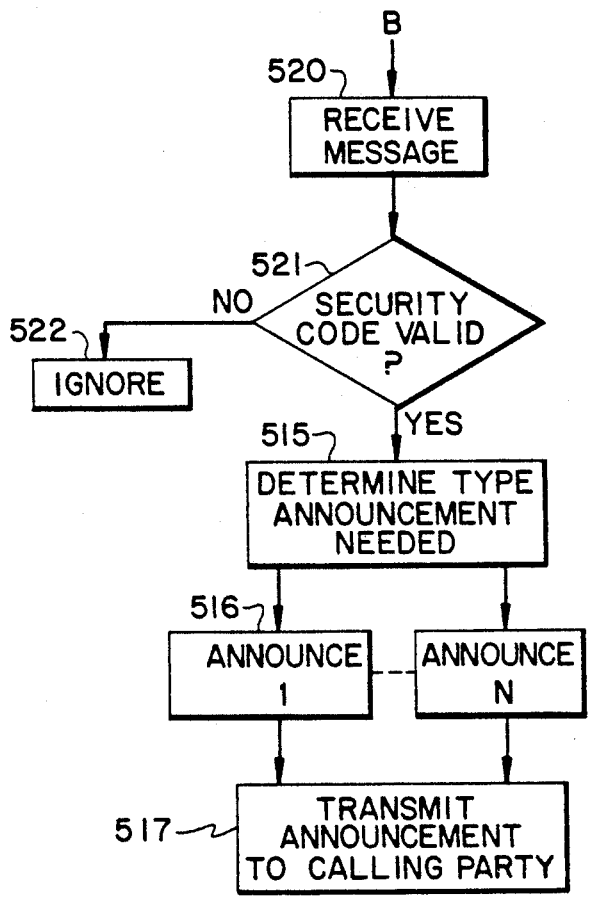
Figure 6:
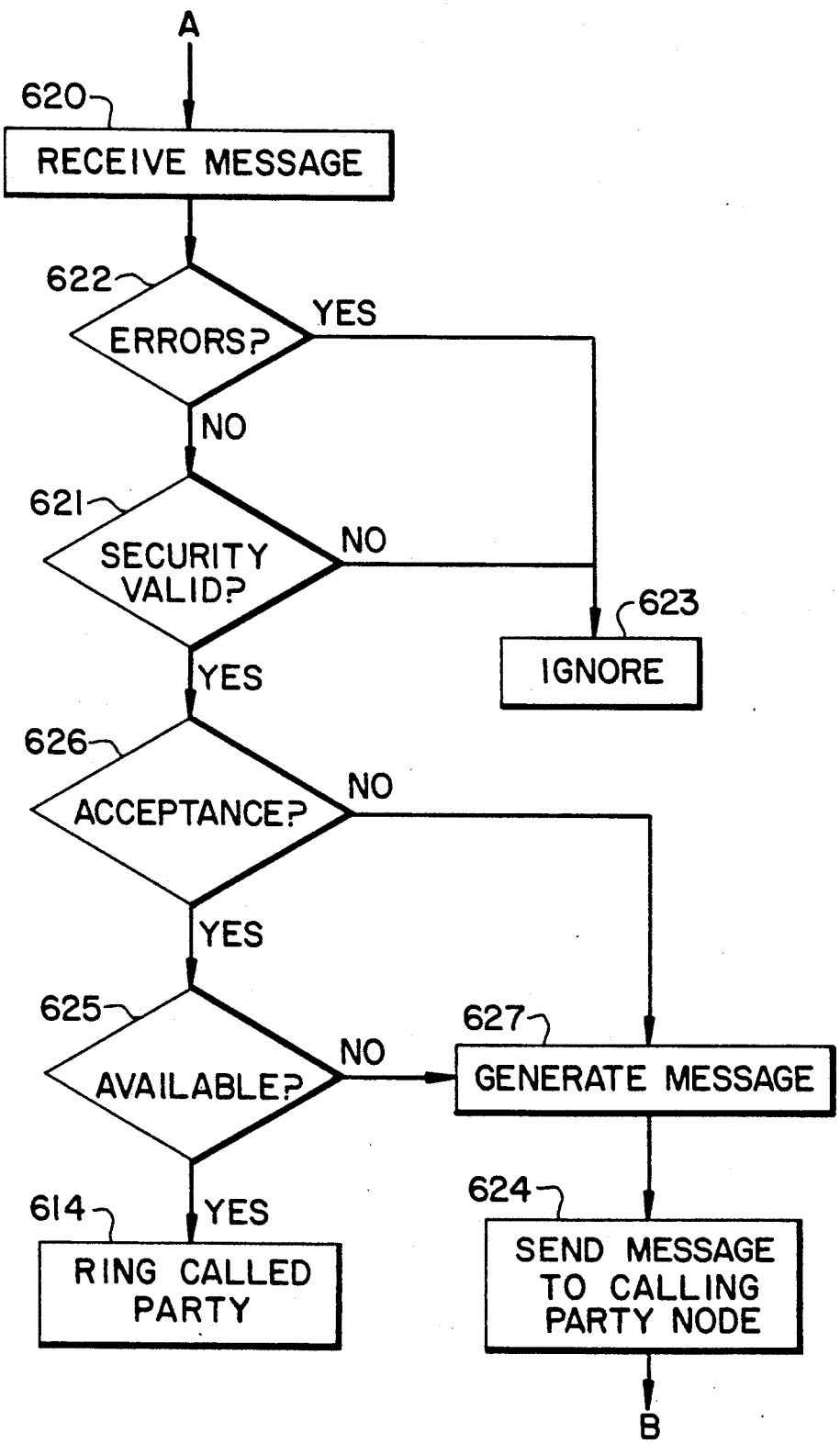
FIG. 6 illustrates the main steps involved at a called party's node or location, in accordance with the present invention.

FIGS. 5a, 5b and 6 illustrate various steps in the process or method involved in the present invention. FIG. 5 illustrates steps at the calling end with FIG. 6 illustrating steps at the receiving end.

Refering to FIG. 5a, an automated attendant is not needed, as for example, when the PBX has been designed to include REDIC capabilities. The calling party goes off hook at 501 and proceeds to dial after receiving a dial tone 500 from the PBX. The PBX receives the called party number 525. The PBX compares the calling and called party numbers with information in its data base to determine if both party's nodes have REDIC equipment and both parties are approved for REDIC 526. It is also determined at step 528 if the called number is at a location where REDIC may produce a savings.

If the calling party is not approved at step 526, the call is handled normally at step 519 as if the PBX had no REDIC capability. When a positive results from approval checks 526 and savings evaluations 528, a message is generated at step 523 to request that the called party PBX place this call in the reverse direction. The request message is sent at step 524 to the called party's PBX.

Referring to FIG. 6, when the called party's PBX receives a request message 620, it checks the message for errors at 622 and determines its validity at 621 from a security viewpoint. If either errors are found at 622 or security at 621 is not satisfied, the message is ignored at 623. If there are no errors at 622 and the security checks valid at 621, the PBX verifies acceptance at 626 by virtue of the calling party being approved for REDIC and that the PBX's current load and configuration are acceptable for REDIC as a result of determining data from a data base (not illustrated).

When REDIC is accepted at 626 and the called party's phone is available 625, i.e. not busy or restricted, ringing energy at 614 is sent to the called party. If the PBX had not accepted at 626, the REDIC request, or had determined that the called party is unavailable at 625, then a message is generated at 627 to decline the REDIC request. The message is sent 624 to the calling party node.

Referring to FIG. 5b, the calling party PBX receives the reject message at 520, verifies its validity at 521, and determines the type of announcement to be made at 515. The received message at 520 is ignored at 522 if the security code is found to be invalid at 521. When the security code is valid and the appropriate announcement is selected at 515, the selected announcement 516 is transmitted to the calling party at 517.

The remaining remarks are directed towards summarizing and illustrating how the present invention may include modifications and features broadly related to those described.

It has been seen from the foregoing description that this invention teaches a means for the caller's equipment to determine if originating a call in the opposite direction is less expensive. This is done at the node location by a REDIC processor comparing the tariffed calling rates charged at both the caller and the called party's ends. Further, if the call can be more economically placed from the called end, REDIC automatically causes the called party node to originate the call. REDIC equipment at the caller's node effects this by sending a message to the distant party's equipment requesting that the called party's equipment place the call.

The information needed to make the cost comparison is stored in a memory. A computer compares various parameters to determine which is the cheaper direction for each call. The stored time of day, international tariff rates, and currency exchange rate are updated periodically to insure that an up-to-date decision can be made as to which location should place the call.

As indicated, the present invention evaluates the cost advantages prior to the decision whether the called or calling party node should place the call. To accomplish this, the data base in the computer is set up to provide: (1) A list of all the numbers involved with agreements the REDIC user has with other REDIC users (i.e., within the same company network); (2) The tariffs associated with all the locations of the associated REDIC users; (3) The minimum cost savings offset to obtain a cost effective reverse call origination. REDIC considers the cost of request implementation, transfer billing, administration, and security risks to determine if a reverse direction call savings is sufficient to offset the costs involved with implementing REDIC.

Other factors are taken into consideration, such as whether or not the laws of the countries involved will allow a call request to be sent and the called party equipment to automatically place the call (rather than the customary method of placing a call).

There are some type calls which do not lend themselves to the advantages of reverse direction calling. These are hot line calls, priority calls, 800 area code calls, calls to or from nodes not REDIC equipped, and calls which require an operator. These types would be listed in a data base which is interrogated for each call as part of the function which indicates whether reverse call is desired.

Accordingly, REDIC system either allows the call to progress normally or effects the call placement in the reverse direction, depending on which direction is less expensive for the related specific locations. The system is arranged to seek the most economical time period(s) which would incur the least cost. REDIC may be arranged to announce the various economy period costs to callers upon request. Or, as a system option, announce the time to wait for a cheaper calling period.

Although the system described uses specific equipment, it can be seen that the same means can be accomplished with a variety of different equipments. Computers for instance can make telephone rate calculations, make the decisions as to whom should place the call and how the message will be sent. PBXs and automated attendants at both ends are capable of providing announcements and placing and receiving calls.

Automatic attendants, which can perform this operation, are made by many manufacturers, some of which are COBOTYX Corp. Inc., Dialogic, Dytel, MPSI, Micrologic, VMX, and Wang. The computer may be of many different types such as an IBM PC or PS/2, AT&T XT or AT, or equivalents. The data communication equipment may be Timeplex, Network Equipment Technologies, Stratacom, or others.

REDIC functions are performed by equipments already available and within the current state of the art. The equipment function utilized are portions of automated attendants, personal computers, modems, packet handlers, ISDN terminals, the public network, and various others mentioned elsewhere in this document. These equipments are arranged, modified, and utilized to accomplish the REDIC functions listed below.

The detailed steps taken by the REDIC system include:

1. Receive called number
2. Utilize stored direct dial rates of both the calling and called locations to determine optimum call placement direction.
3. Allow the call to proceed in the normal fashion by the calling party if insufficient savings can be made.
4. Transmit a request message to the called party node to place the call in the reverse direction if sufficient savings can be obtained.
5. Receive a REDIC request message.
6. Originate a callback at the called party node by establishing a connection with the calling party node.
7. Receive callback. Verify a reliable match using the request number, password, caller ID and other security information as needed.
8. Recorded announcement(s) and call progress tones are presented such that both parties experience good human factors treatment.
9. Complete the connection between the parties involved.
10. Release connection at either end as for most present day telephone calls.

When it is determined that a cost savings can be realized by having the call originate in the reverse direction, a request message is sent. While this is being accomplished, the caller may be provided silence or a recorded announcement requesting the calling party to wait for REDIC to establish the most economical connection.

REDIC may set up a connection in such a manner that the parties involved will not perceive any difference as to which end actually originated the call. In cases where it is desired that one or both parties know of the automatic call reversal, recorded announcements may be provided. Examples of announcements are "Please hold, your call to Mr. Smith is being placed via the most economical means by REDIC" and "Mr. Smith's line is busy, we will continue to try for 30 minutes; please hang up. REDIC will call you back with the most economical connection when Mr. Smith's line is free."

The means for requesting that the distant party's equipment place (originate) the call can take many forms, e.g. ISDN switched packet message, Telex, TWX, voice connection using modems, leased data line, sharing leased data lines, statistical multiplexing of data lines, Data Over Voice (DOV), the public packet network, public paging, and others. A public paging network example is Metrocast in San Diego, Calif. who receive up to 55 alphanumeric characters per message from a satellite and retransmit to an NEC PGR9000 Paging receiver. This public paging is adaptable to a REDIC system.

DOV may be used to set up additional calls when another call is in progress between two locations desiring REDIC assistance. The means used in this description for requesting a call origination is the public packet switched network where an individual packet or packets can be economically sent in one or both directions.

A REDIC location is always ready to receive an incoming request message. When it does, it verifies the security code, the requesting party's ID, and that the called line is idle and accepting calls. A typical request message contains the number that should be dialed, a request sequence number, originating location ID, a password, error checking, and encryption. A security code and identification (ID) are included for the called party node to determine the validity of the request and the number to be dialed. The ID may be the originators telephone number or a prearranged code that both parties agree on.

The methods of accomplishing REDIC are many and additional methods may become apparent as the state of the art progresses. For instance, calling number identification is a recent development in telecommunications. This feature sends the calling party's number to the called party's equipment. REDIC may be configured to recognize specific calling party numbers on incoming calls at specific times of day in lieu of a request message. Upon this recognition, REDIC will not answer the call but rather place a call in the reverse direction as if it had received a REDIC request. The reverse direction call is placed on another local trunk to a predetermined telephone number of the calling party. Handshaking and information transfer that is performed when the calling node answers includes a specific code which indicates that the call is a REDIC response to the unanswered pending call. The sequential steps are performed as described earlier to complete the connection.

When used, the security code or password may be unique to the calling party, department, division, company, or country. Sophisticated security code generators may be used to change the key or code number at both ends periodically. An example of this equipment is the Access Control Encryption (ACE) marketed by Security Dynamics in Boston, Mass. Another security implementation may be a recorded voice sent with the purpose of having voice signature verification.

REDIC accommodates lost, abandoned, and denied requests which may occur for a number of reasons. The receiving REDIC location will ignore a request message if the password or other parameters are not acceptable. The requesting location will revert to a recorded announcement or be optionally configured to place the call normally if there is no response to a reverse direction call request.

A reject message may be received by the calling party's REDIC equipment. Depending on the reject message given, the calling party will be given either the appropriate tone or a recorded announcement. Appropriate announcements are composed for each of the unavailability conditions offered by the called party's REDIC configuration.

When the desired line is busy, accepting only messages, or otherwise unavailable, with present day telecommunications (without REDIC), the calling party may have to accept other alternatives. Some of the alternatives may be to call later or to be transferred and incur long delays and a fruitless expenditure of time and money. The long delays involve a high percentage of silence, dead time, or additional transfers. In summary, the unavailability expenditure is at the relatively high cost of switched service public network charges.

With PBXs that do not have Direct Inward Dialing (DID), the calling party is billed for the call as soon as the manual or automated attendant equipment emits an off-hook indication. In cases where the called party's telephone is busy or is not answered, the user incurs a needless cost. REDIC avoids the cost of having to pay to learn that the called line is unavailable. REDIC does this without making a network connection by sending a reject message with the reason for unavailability. It does this in its repertoire of request and reject messages and its recorded announcements. This information provides the caller with the opportunity to consider the alternatives without actually placing the call.

Viewing REDIC from the called party perspective, there can be various kinds of request standby options. One is to receive calls at any time from specific requesting parties. Other options are to deny all requests, ignore all requests, or accept calls whenever the phone is not busy. If the phone is busy, an information message will be sent to the calling party node, i.e. will notify when available, line is busy, or please try again. All of these options serve to disclose the conditions that exist at the called party location to optimize economy.

The requested REDIC location originates the call in the reverse direction by placing a public switched service network call back to the telephone number provided in the request message. To originate the call as requested, a call is automatically dialed to a predetermined number or the number that the request message designated. If a busy signal is encountered, the call will be abandoned and retried every 5 seconds up to 3 times. If the busy signal persists, a reject message will be sent. Retry preferences and requirements are adjustable system variables and will vary from customer to customer.

When an incoming call is answered, REDIC sends a short identifying burst and monitors the incoming call for REDIC signals expected from a reverse direction call. The system disclosed discriminates between normal non-REDIC incoming calls and reverse direction calls (received as a result of a REDIC request). If no REDIC codes are detected within a reasonable period of time, an automated attendant announcement is made to accommodate ordinary incoming calls from the network. The automated attendant's starts its DTMF detection a short period of time after the moment of answer (ring trip). The automated attendant equipment monitors for ordinary incoming calls at the same time as REDIC monitors for a response to REDIC requests. The audio interface is full duplex so that both equipments can detect and evaluate incoming signals regardless to whether a recorded announcement is being sent.

When a REDIC identification is returned (while off hook or on hook) from the original calling party's equipment, the requested end sends information such as any or all of the following:
1. Coded acceptance number.
2. Calling party number.
3. Called party number.*
4. Password.
5. Security code.
6. Encryption key.
7. Transaction number
8. Data as desired.

* Number 3 above can also be accomplished using ISDN or Bellcore's CLASS feature, calling number identification as described earlier.

The transmission of information may be accomplished by DTMF, analog modem transmission, digital data, or other forms which may become technically feasible in the future. When the incoming call is verified as a return call response to a REDIC request, the calling and called parties are identified and matched, the transmission path is established allowing their conversation to begin. In the case where the called party has answered before the return call is effected, an announcement is given to inform the called party that a REDIC call is in process, and from where it is coming.

REDIC and other node equipments clear the call when either party disconnects. The times of each event involved in REDIC calls are recorded in the data bases for use with off line processing to verify billing and transfer compensation moneys from the calling to called parties. REDIC equipment may store call records at both ends in order to verify billing, study cost savings, and enable accounting departments to allocate expenses and transfer funds.

Although this specification describes Reverse Direction voice Call in the public network, it can be seen that the theories described equally apply to other networks and other forms of transmission and storage, i.e. voice, data, private networks, voice store and forward, telegrams, TWX, TELEX, video, and others.

What is claimed is:

1. In combination with a digital processing system including a data base, a process of deriving information from said data base to connect a call through a telecommunications network from a calling location to a called location having different calling rates, characterized by:
   a. retrieving data from said data base relating to the calling rates at said calling and called locations when said call is placed,
   b. comparing the calling rates of said calling and called locations to provide information to determine which location has the lower calling rate at the time said call is placed,
   c. originating the call from the location having the lower call rate, and
   d. utilizing said telecommunications network between said calling and called terminal locations to utilize the networks calling party identification to notify the called location that the called location should initiate a call initiation and a call connection.

* * * * *